US010785152B2

(12) United States Patent
Sufleta et al.

(10) Patent No.: US 10,785,152 B2
(45) Date of Patent: *Sep. 22, 2020

(54) NETWORK SWITCH DEVICE FOR ROUTING NETWORK TRAFFIC THROUGH AN INLINE TOOL

(71) Applicant: Gigamon Inc., Santa Clara, CA (US)

(72) Inventors: Zbigniew Sufleta, Cobb, CA (US); Anant Kumar, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,708

(22) Filed: Jun. 5, 2018

(65) Prior Publication Data

US 2018/0287933 A1 Oct. 4, 2018

Related U.S. Application Data

(63) Continuation of application No. 14/880,036, filed on Oct. 9, 2015, now Pat. No. 10,009,263.

(51) Int. Cl.
*H04L 12/741* (2013.01)
*H04L 12/931* (2013.01)
*H04L 12/935* (2013.01)

(52) U.S. Cl.
CPC .............. *H04L 45/74* (2013.01); *H04L 49/30* (2013.01); *H04L 49/354* (2013.01)

(58) Field of Classification Search
CPC ......... H04L 45/38; H04L 45/74; H04L 49/30; H04L 49/354
USPC ....................................................... 370/389
See application file for complete search history.

(56) References Cited

U.S. PATENT DOCUMENTS

| 5,764,634 | A | 6/1998 | Christensen et al. |
| 5,940,376 | A | 8/1999 | Yanacek et al. |
| 6,567,408 | B1 | 5/2003 | Li et al. |
| 6,597,661 | B1 | 7/2003 | Bonn et al. |
| 6,757,742 | B1 | 6/2004 | Viswanath et al. |
| 6,853,639 | B1 | 2/2005 | Nozaki et al. |
| 6,925,085 | B1 | 8/2005 | Krishna et al. |
| 6,950,434 | B1 | 9/2005 | Viswanath et al. |
| 7,596,808 | B1 | 9/2009 | Wilkinson et al. |

(Continued)

OTHER PUBLICATIONS

Non-Final Office Action dated Aug. 25, 2017, for U.S. Appl. No. 14/880,036 of Sufleta et al. filed Oct. 9, 2015.

(Continued)

*Primary Examiner* — Chi Tang P Cheng
(74) *Attorney, Agent, or Firm* — Perkins Coie LLP (57) ABSTRACT

Introduced here is a technique for using a network switch device, which may include commodity switching fabric, to route packets through an inline tool, without introducing any additional information to the packets. The introduced technique modifies standard capability of packet forwarding and learning port-to-MAC address associations to route data packets through the inline tool. The technique may include applying two override settings to the network device. A first override setting involves a forwarding rule that is based on the arrival port and the content of the packet. A second override setting involves disabling the MAC address learning mechanism for the packet received from the inline tool via the second tool port of the network device.

21 Claims, 6 Drawing Sheets

(56) References Cited

U.S. PATENT DOCUMENTS

| | | | |
|---|---|---|---|
| 8,223,741 B1* | 7/2012 | Bartlett | H04L 45/741 370/349 |
| 8,964,753 B2 | 2/2015 | Basso et al. | |
| 9,065,723 B2 | 6/2015 | Stevens et al. | |
| 9,356,866 B1 | 5/2016 | Krishnan et al. | |
| 9,479,522 B1 | 10/2016 | Cirkovic et al. | |
| 9,497,205 B1 | 11/2016 | Claudatos et al. | |
| 9,565,100 B1 | 2/2017 | Edsall et al. | |
| 9,674,115 B2 | 6/2017 | Raza et al. | |
| 10,009,263 B1* | 6/2018 | Sufleta | H04L 45/38 |
| 2001/0052087 A1 | 12/2001 | Garg et al. | |
| 2003/0033435 A1 | 2/2003 | Hanner et al. | |
| 2003/0142676 A1 | 7/2003 | Zeisz, Jr. et al. | |
| 2003/0147385 A1 | 8/2003 | Montalvo et al. | |
| 2004/0190547 A1 | 9/2004 | Gordy et al. | |
| 2005/0005031 A1 | 1/2005 | Gordy et al. | |
| 2005/0013300 A1 | 1/2005 | Akahane et al. | |
| 2006/0215566 A1 | 9/2006 | Walsh et al. | |
| 2007/0081549 A1 | 4/2007 | Cicchetti et al. | |
| 2007/0280222 A1* | 12/2007 | Smith | H04L 12/5692 370/360 |
| 2009/0006600 A1 | 1/2009 | Siegmund et al. | |
| 2009/0259811 A1 | 10/2009 | Krishnan et al. | |
| 2010/0118885 A1 | 5/2010 | Congdon et al. | |
| 2011/0058566 A1 | 3/2011 | Leong et al. | |
| 2011/0211473 A1 | 9/2011 | Matityahu et al. | |
| 2011/0214181 A1 | 9/2011 | Matityahu et al. | |
| 2011/0276824 A1 | 11/2011 | Cheung et al. | |
| 2012/0317566 A1 | 12/2012 | Santos et al. | |
| 2013/0201984 A1 | 8/2013 | Wang | |
| 2013/0259037 A1* | 10/2013 | Natarajan | H04L 43/026 370/390 |
| 2013/0259045 A1* | 10/2013 | Johansson | H04L 45/306 370/392 |
| 2014/0022891 A1 | 1/2014 | Matityahu et al. | |
| 2014/0201307 A1 | 7/2014 | Banavalikar et al. | |
| 2014/0219081 A1* | 8/2014 | Natarajan | H04L 41/0659 370/228 |
| 2015/0319070 A1 | 11/2015 | Nachum | |
| 2017/0026227 A1 | 1/2017 | Lian et al. | |
| 2017/0026287 A1 | 1/2017 | Vinsel et al. | |
| 2017/0141996 A1* | 5/2017 | Sufleta | H04L 45/02 |

OTHER PUBLICATIONS

Non-Final Office Action dated Jun. 30, 2017 for U.S. Appl. No. 14/945,347 of Sufleta, Z. et al. filed Nov. 18, 2015.

U.S. Appl. No. 14/880,036 of Sufleta, Z. et al. filed Oct. 9, 2015, pp. 1-37.

U.S. Appl. No. 14/945,347 of Sufleta, Z. et al. filed Nov. 18, 2015, pp. 1-35.

Notice of Allowance dated Apr. 4, 2018 for U.S. Appl. No. 14/880,036 of Zbigniew Zufleta., et al., filed Oct. 9, 2015.

* cited by examiner

NETWORK SWITCH DEVICE FOR ROUTING NETWORK TRAFFIC THROUGH AN INLINE TOOL

CROSS-REFERENCE TO RELATED APPLICATIONS

This application is a continuation of U.S. patent application Ser. No. 14/880,036, filed Oct. 9, 2015, now issued as U.S. Pat. No. 10,009,263, which application is incorporated by reference herein in its entirety.

TECHNICAL FIELD

The present disclosure is generally related to network switch devices, and more particularly, to commodity network switch devices that route network traffic through an inline tool.

BACKGROUND

With ever-increasing amounts of data traffic on modern computer networks, network monitoring tools play an increasingly important role in reducing the vulnerability of a network to intrusion, unauthorized access and other security or performance issues. Examples of network monitoring tools include an intrusion detection system (IDS), an intrusion prevention system (IPS), a sniffer, a network monitoring system, an application monitoring system, an intrusion detection system, a forensic storage system, an application security system, among others. An "inline" network monitoring tool (or "inline tool") is a tool that is part of the data flow, or path, between two other devices that are part of the network and communicate with each other on the network.

A network device may receive data packets from a source node on a network and utilize packet switching to forward the packets on the network for transmission to a destination node. Such a network device may also first pass the packets it receives to an inline tool such as described above, before forwarding them to the destination network node. The network device includes multiple network ports for transmitting packets to and from various network nodes, and further includes one or more tool ports for routing those packets to an inline tool for analysis. Such inline connectivity provided by the network device enables uninterrupted traffic flow between computing devices connected together on the network. However, existing techniques that use a network device to route packets through an inline tool have various limitations.

DETAILED DESCRIPTION

Introduced here is a technique for using a network device (e.g., an appliance) to route packets being communicated on a network through one or more inline tools, by selectively using certain standard-specified features of a commodity network switching fabric while overriding and customizing other standard-specified features of the switching fabric. In the context of this description, the network device forwards packets that it receives, from one or more external network nodes on a network, to at least one external inline tool. The inline tool then returns those packets to the network device after analysis or other processing of those packets, and the network device then forwards the returned packets on the network to their intended destinations.

An example of a commodity network switching fabric is a layer 2 commodity switching fabric. As used here, the term "layer 2 switching fabric" refers to a device that uses hardware addresses (i.e., "MAC addresses") of computing devices connected together on a network to receive and forward data packets at the data link layer (i.e., "layer 2") of the OSI model. One goal of the technique introduced here is to properly route data packets received by the network device through one or more external inline tools without introducing any additional information into (or otherwise modifying) the packets, since modification of packets might causes errors or misinterpretation by the inline tool(s). Accordingly, the technique introduced here can take advantage of, and modify, a layer 2 commodity switching fabric's media access layer (MAC) address learning and packet forwarding mechanisms specified by IEEE standard 802.1 D, to achieve proper forward of packets through one or more external inline tool(s).

In at least some embodiments, the technique introduced here includes modifying the IEEE 802.1 D specified MAC address learning and packet forwarding mechanisms of the network device to accomplish proper routing of packets. The modifications involve applying two different override settings. One override setting is configured to cause the network device to execute only the MAC address learning mechanism for network ports of the device, while overriding the forwarding mechanism with a custom forwarding mechanism that is not using the learned associations between MAC addresses and ports. The other override setting is configured to cause the network device to execute only the packet forwarding mechanism for tool ports of the device while preventing the source MAC addresses from being learned. In some scenarios, the modifications also include a third override setting, configured to cause the network device to override the packet forwarding mechanism for the network ports, and execute a custom forwarding mechanism that forwards, or routes, packets directly to the known destination port when the packets is identified in one of the following types of packets: (1) MAC layer broadcast and multicast packets; and (2) packets carrying MAC destination addresses that are not present in a MAC address table of learned addresses and ports associations.

Figure 2:
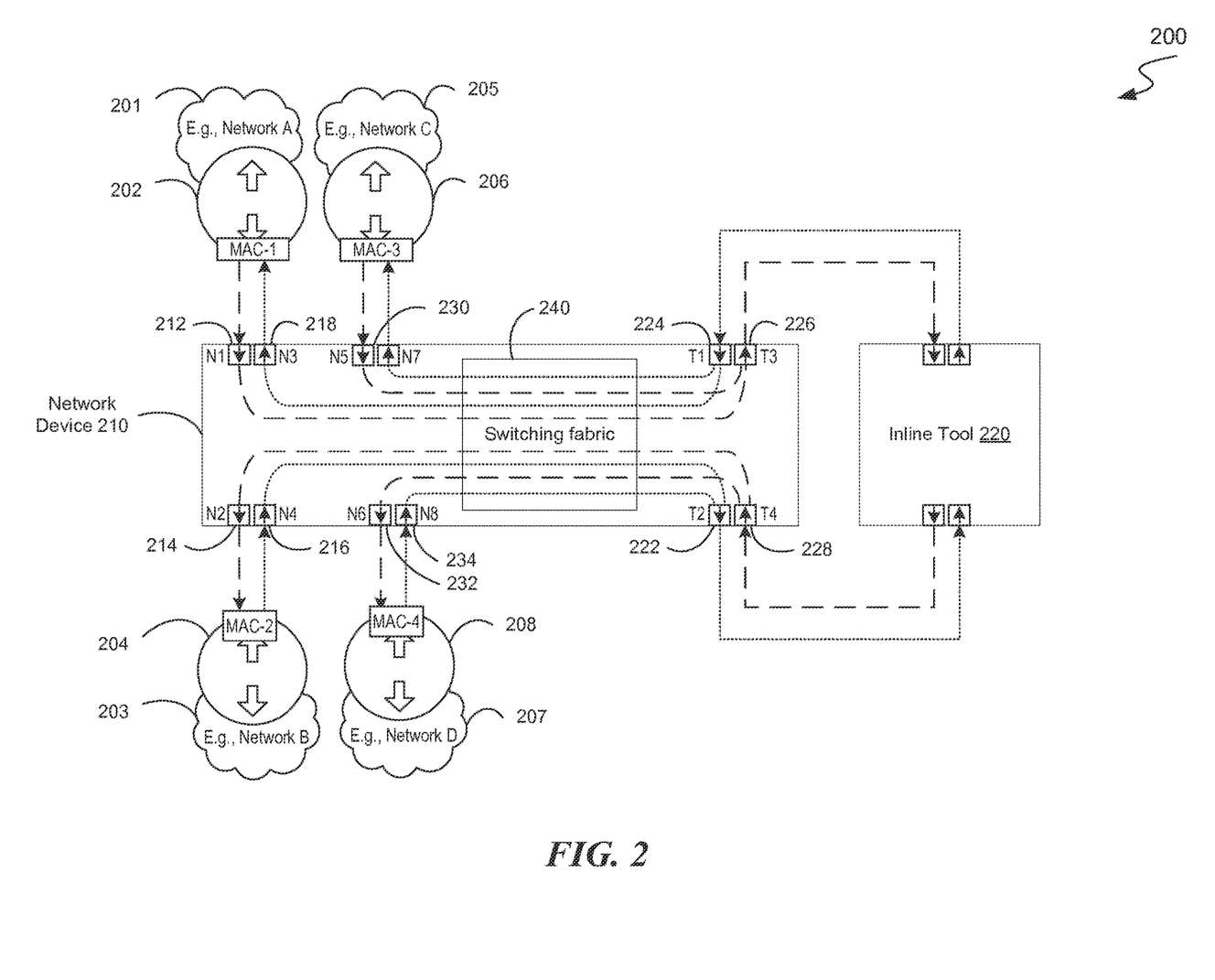
FIG. 2 illustrates a configuration of a network device in connection with an inline tool for providing a way to monitor network traffic flow.

Traditionally, a commodity network switching fabric is configured to implement standard MAC address learning and packet forwarding mechanisms (e.g., per IEEE 802.1D) when routing packets between ports of a network device (e.g., ports 212 and 214 of FIG. 2). The standard MAC address learning mechanism involves memorizing the association between a source MAC address seen in a packet received at a given port of the network device and the port on which it was received. The learned associations between MAC addresses (e.g., "MAC-1") and port numbers (e.g., "N1") are stored in a look-up address table ("address table"), a hardware-based data structure stored in memory. The network device can later access the learned associations stored in the address table to make forwarding decisions, using the standard packet forwarding mechanism. The forwarding decisions are based on the particular destination MAC address in a packet received at the arrival network port (e.g., first network port) of the network device.

With the traditional routing technique discussed above, however, packets cannot be routed properly to the appropriate destination port when the network device that performs the packet forwarding is also responsible for routing packets through an external inline tool before forwarding them to their intended destinations. For example, with the traditional mechanisms a packet received at a first network port (ingress network port) of the network device would be routed directly to at second network port (egress network port) based on learned association between that packet's destination MAC address and the second network port), instead of to an inline tool port (egress tool port) for analysis. Further, when the packet comes back to the network device via another tool port (ingress tool port) after analysis by the inline tool, under the traditional mechanisms the network device would attempt to implement the standard MAC address learning mechanism again under the traditional technique. Allowing this learning by the network device leads to overriding the port-to-MAC-address associations created for arrival network ports, thereby preventing a packet from being properly routed to its destination MAC address.

Some existing techniques have attempted to solve this problem of the standard learning mechanism by inserting additional information into a packet prior to sending the packet to the inline tool, to help route the packet properly. One example of such a technique involves utilizing the virtual local area network (VLAN) standard to route the packet. Under such standard, a virtual area network (VLAN) operates as a dedicated broadcast domain. A VLAN "tag," which is four bytes in size, is injected into a packet to identify the VLAN to which the packet belongs, such that the packet can be routed to the appropriate destination on its return journey (e.g., after being processed by the inline tool).

Using the VLAN standard for routing through the inline tool, however, has disadvantages. For example, use of VLAN tags necessarily adds complexity to the monitoring process, such as having to set up the VLAN infrastructure, inject the VLAN tag to the packet, and set up the catching mechanism to capture the packet on its return journeys. Additionally, under the VLAN standard, only 4000 communication endpoints can be established due to the four-byte size of a VLAN tag.

Additionally, while techniques other than use of VLAN tags may exist, those techniques also inject additional information into the packet for routing it through the inline tool. Such introduction of additional information results in an undesired modification of the original content of the packets; the additional information can confuse the inline tool in its analysis of the packet.

In contrast, the technique introduced here properly routes a packet, intended for transmission from a first network port to a second network port of the network device, through an inline tool and back to the network device, and on to its destination, without adding any information to the packet. In at least some embodiments, the technique involves applying two override settings to the network device. A first override setting involves forwarding the packet based on the arrival port (i.e., the ingress network port on which the packet is received) and on the content of the packet. In particular, the first override setting configures the network device to override the forwarding mechanism associated with the traditional learned MAC address association. As a result, the packet is forwarded from the arrival port to an egress tool port of the network device. That is, all packets received at the (arrival) network port of the network device are forwarded to tool ports coupled to the inline tool, instead of being forwarded per their destination MAC addresses (in accordance with the learned MAC address).

A second override setting applied to the network device involves disabling the MAC address learning mechanism for any packet received from the inline tool via an ingress tool port of the network device. In particular, such disabling can be achieved by assigning all network ports and all tool ports to be in the same class, and setting a class priority of the network ports to be higher than a class priority of the tool ports. When the network ports have a higher priority than the tool ports, the network device is prevented from performing a "station move" when the same packet is received from a tool port since the tool port's priority is lower than that of the network port. As a result, the packet, upon returning to the network device from the inline tool, is forwarded properly from the ingress tool port to the egress network port, based on the learned destination MAC address associated with that network port.

Furthermore, in some embodiments, when the content of the packet indicates that the packet is either of a broadcast type or a multicast type, a third override setting is applied. The third override setting causes the network device to override the packet forwarding mechanism for the ingress network ports, and to execute a custom forwarding mechanism that forwards, or routes, each packet directly to two destination ports: (1) the egress network port leading to the destination network node and (2) the egress tool port leading to the inline tool. The network device is further configured by the third override setting to drop the packet coming back from the inline tool (i.e., the packet received via the ingress tool port is not forwarded). Similar to the second override setting, the third override setting can disable the MAC address learning mechanism for any packet received by the inline tool, so that the MAC address learning mechanism does not learn the association between the packet received by the inline tool and the inline port.

Among other benefits, the introduced technique provides a solution that takes advantage of existing network switching fabrics (e.g., commodity layer 2 switches) and their standard MAC address learning capability, thereby providing a low-cost solution while eliminating the complex infrastructure setups inherent in existing solutions. Furthermore, the address table of the standard MAC address learning capability enables use of, e.g., thirty two thousand communication endpoints for routing packets. In various embodiments, the number of communication endpoints for routing packets can vary. Additionally, as the introduced technique provides a solution using a hardware-based address table, the technique can support a high data throughput (e.g., terabytes of data), unlike existing software-based solutions.

It is noted that in this description, the term "packet" can refer to the original packet transmitted from a network node, or a copy of it. Additionally, the term "tool port" refers to any port through which packets are to be transmitted to or from a tool. The tool can be a pass-through device (i.e., it can receive packets, and transmit the packets back to the network device after the packets have been processed), such as an intrusion prevention system. In some embodiments, the tool can be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc. Furthermore, the terms "first", "second", etc., are used to refer to different things, and do not necessarily refer to the order of things.

Additionally, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Figure 1:
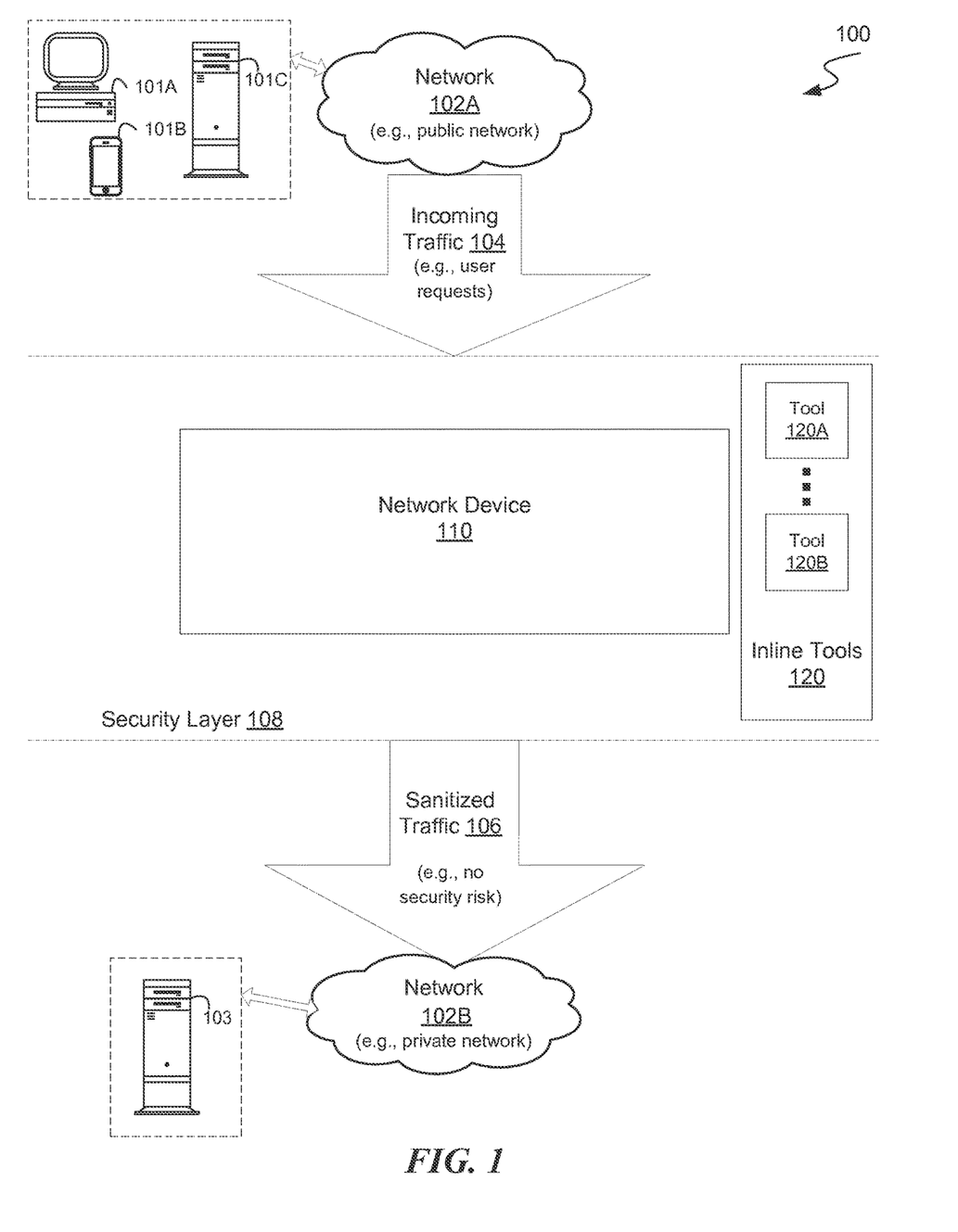
FIG. 1 illustrates a network environment for deployment of a network device.

FIG. 1 shows an example of a network-based environment 100 for deployment of a network switch device (or simply "network device") 110 in accordance with some embodiments. The environment 100 includes a network 102A, a network 102B and a security layer 108 between the networks 102A,102B. The security layer 108 includes a network device 110 and one or more inline tools 120. One or more computing devices 101 (e.g., a personal computer (PC) 101A, a smartphone 101B, a server 101C, etc.) can communicate with a server 103 via a network (e.g., the Internet). For example, a PC 101A, through a (public) network 102A, can access information and/or services provided by the server 103 operating within a (private) network 102B.

The network device 110 enables communication of data packets between the devices 101 and the server 103, in addition to routing the data packets through the inline tools 120 for examination and processing. In accordance with various embodiments of the disclosed technology, the network device 110 is a conventional layer 2 switch. Examples of the network device 110 that can be used to implement features described herein include any of the commercially available network switch devices, such as GigaVUE™ line of products, available from Gigamon Inc. of Santa Clara, Calif.

For illustrative purposes, consider an example of a network of an online bank. A banking customer can use the smartphone 101B to connect, via the Internet, to an online banking service operated by the server 103 to request login to her online bank account (e.g., for money transfers, deposits, etc.). The customer's user login request is received via the network 102A in the form of incoming traffic 104. The incoming traffic 104 typically must traverse the security layer 108 (e.g., a firewall) before being admitted into the private network 102B for accessing the online banking services provided by the server 103. The security layer 108 can employ the network device 110 for routing traffic between the network 102A and the network 102B, and further for routing the traffic through the inline tools 120. The inline tools 120 can include, for example, an IDS, an IPS, a sniffer, a network monitoring system, an application monitoring system, an intrusion detection system, a forensic storage system, an application security system. The inline tools 120 can help, for example, the online bank, to verify that the incoming traffic 104 gets "sanitized" and/or to help prevent attacks on the network 102B of the online bank. If the inline tools 120 do not detect any bad actors, the data packets are forwarded through to the network 102B for further processing by the server 103, e.g., authentication of user login, access to banking services, etc.

FIG. 2 illustrates a configuration 200 of a network device 210 in connection with an inline tool 220 for providing a way to monitor network traffic flow, in accordance with some embodiments. The network device 210 can be the network device 110 of FIG. 1. As illustrated in FIG. 2, the configuration 200 includes the network device 210 set up to route packets between a network 201 (e.g., Network A) and a network 203 (e.g., Network B), and between a network 205 (e.g., Network C) and a network 207 (e.g., Network D). For example, the network device 210 can route packets from a network node 202 to a network node 204, and vice versa. Similarly, the network device 210 can route packets from a network node 206 to a network node 208, and vice versa. The network device 210 can further route the packets, being transmitted between the network nodes (e.g., 202 and 204 and/or 206 and 208), through the inline tool 220 for analysis. To carry out these routing functions, the network device 210 may include a commodity switching fabric 240.

For transmission of packets between a particular set of network nodes, the network device 210 includes at least two sets of network ports. For example, a first set of network ports includes a first network port 212 ("N1") and second network port 214 ("N2") for transmission of packets between the network nodes 202, 204. A second set of network ports includes a first network port 216 ("N4") and a second network port 218 ("N3") for transmission of packets between the network nodes 204, 202. Similarly, for transmission of packets between the network nodes 206, 208, the two sets of network ports includes network ports 230, 232 ("N5, N6") and network ports 234, 236 ("N8, N7"). The network device 210 also includes at least two sets of tool ports for routing the packets through the inline tool 220. The first set of tool ports includes a first tool port 222 ("T2") and a second tool port 224 ("T1"). The second set of tool ports includes a first tool port 226 ("T3") and a second tool port 228 ("T4"). Accordingly, in some embodiments, the configuration 200 advantageously allows monitoring of at least two different network traffic links using a single inline tool.

In operation, the network device 210 can receive packets originating from the network 201 through the first network port 212 ("N1"). The network device 210 can route the packets to the first tool port 226 ("T3"), through which the packets are going to the inline tool 220 for processing. In particular, the network device 210 routes the packets based on a first override setting applied to the packet transmission configuration of the network device 210. The packet transmission configuration defines how the network device 210 transmits packets received at the different ports (e.g., network ports and/or tool ports) of the network device 210. The packet transmission configuration can include a MAC address learning mechanism and a packet forwarding mechanism, where these mechanisms respectively modify the off-the-shelf, standard-based (e.g., IEEE 802.1 D based) MAC address learning and forwarding behaviors of the commodity switching fabric in the network device 210. In particular, the IEEE 802.1D packet forwarding mechanism, by default, automatically "forwards" (i.e., transmits or routes) a packet, received at the first (arrival) network port, to a (destination) port associated with that packet's destination MAC address. The first override setting causes the network device 210 to transmit the packet to the appropriate egress tool port (as opposed to the destination network port) by disabling the standard packet forwarding mechanism.

Accordingly, based on the first override setting, the network device 210 transmits the packets to the inline tool 220 for analysis instead of the destination MAC address stored, e.g., in the header of the packets.

After being processed by the inline tool 220, the packets are then transmitted back to the network device 210, where the packets are received at the second tool port 228 ("T4"). Upon receiving the packets via the tool port 228, the network device 210 directs the packets to the second network port 214 ("N2") for transmission to the network 203 via the network node 204. In particular, the network device 210 routes the packets based on a second override setting applied to the packet transmission configuration of the network device 210.

The second override setting causes the network device 210 to preserve the originally learned port-to-MAC address association (e.g., network port "N1" and MAC address "MAC-1") by disabling, or "overriding," the standard MAC address learning mechanism. That is, the second override setting prevents the network device 210 from implementing MAC address learning that would result in the originally learned association being replaced (e.g., by a new association between MAC address "MAC-1" and tool port "T4"). Without disabling of the MAC address learning mechanism, the network device 210 would perceive that a station move has occurred and replace the learned entry with the newly learned one.

In some embodiments, disabling the MAC address learning mechanism involves (a) placing the network and tool ports of the network device 210 in the same class and (b) configuring the network ports to have a higher priority than the tool ports. When the network ports have a higher priority, the network device 210 will not perceive the packets arriving at the tool port 228 as a station move; consequently, where there is no station move detected, the network device 210 will not attempt to learn the association between the tool port and the source MAC address of the packets. Accordingly, based on the second override setting, the network device 210 can implement forwarding of the packets by accessing the originally learned association in the address table (e.g., by looking up the packets' destination MAC address and its associated network port). As a result, the network device 210 can transmit the packets to the second network port 214 ("N2") for transmission to the network node 204, using the originally learned destination MAC address.

In some embodiments, the network device 210 can handle multiple traffic flows through the same inline tool 220. For example, the network device 210 can route a second flow of packets to the same inline tool 220, between the network 205 and the network 207. In particular, the network device 210 can receive packets originating from the network 205 through the first network port 230 ("N5"). The network device 210 can direct the packets, based on the first override setting (discussed above), to a first tool port 226 ("T3"), through which the packets are going to the inline tool 220 for processing.

The packets, after being processed by the inline tool 220, are then received at a second tool port 228 ("T4") of the network device 210. The network device 210, based on the second override setting (discussed above), can then direct the packets to the second network port 232 ("N6") for transmission to the network node 208 associated with the network 207, using the originally learned destination MAC address.

As discussed above, the network device 210 can receive and route packets in a reverse direction between the networks 203 and 201, and similarly between the networks 207 and 205. For example, the packets originating from the network 203 can enter the network device 210 through the network port 216 ("N4"). The network device 210 can direct the packets to the tool port 222 ("T2"), through which the packets are going to the inline tool 220 for processing. These packets are then received at the tool port 224 ("T1"), and directed by the network device 210 to the network port 218 ("N3") to be sent to the network 201 at the network node 202.

Similarly, for example, the packets originating from the network 207 can enter the network device 210 through the network port 234 ("N8"), and the network device 210 can direct the packets to the tool port 222 ("T2"), through which the packets are going to the inline tool 220 for processing. These packets are then received at the tool port 224 ("T1"), and directed by the network device 210 to the network port 236 ("N7") to be sent to the network 205 at the network node 206.

In some embodiments, port-to-MAC-address associations may not have been learned by the network device 210 to perform forwarding (e.g., when the packets return to the network device 210 after being processed by the inline tool 220). In such embodiments, the network device 210 is configured forward the packets directly to the opposite network. For example, packets received at the network port 212 ("N1") (i.e., coming from the network 201) are forwarded to the network port 214 ("N2") (i.e., for delivery to the network 203). On the other hand, packets received at the network port 216 ("N4"), for example, are forwarded to the network port 218 ("N3"). In another example, packets received at the network port 230 ("N5") (i.e., coming from the network 205) are forwarded to the network port 232 ("N6") (i.e., for delivery to the network 207). On the other hand, packets received at the network port 234 ("N8"), for example, are forwarded to the network port 236 ("N7").

In some embodiments, the network device 110 is configured to determine the type of the packets received before routing the packets. In such embodiments, if the packets are determined to be either multicast-type packets or broadcast-type packets (i.e., not unicast-type packets), the network device 210 forwards the packets to two destination ports. A broadcast packet is configured generally to be "broadcast," or transmitted to all network nodes of a switch. The broadcast packet is not typically memorized in the address table because of its broadcast address configuration. A multicast packet is configured generally to be multicast, or transmitted to multiple network nodes of a switch. The multicast packet is not typically memorized in the address table, and instead is memorized in a different table reserved for memorizing multicast groups. For example, when a multicast packet arrives, the network device can perform a look-up in the multicast table to identify which ports (i.e., ports associated with identified network nodes) are participating in the multicast of that packet. In accordance with the embodiments disclosed here, a multicast packet is treated similarly to a broadcast packet.

Accordingly, in some embodiments, the network device 210 is configured so that, when the packets are identified as either broadcast packets or multicast packets, it routes the packets to (1) a port leading to the opposite network node and (2) a port leading to the inline tool 220. That is, the network port and the tool port would each receive a copy of the packets. The network device 210 is further configured to drop, or relinquish, the copy of the packets transmitted to the inline tool upon receiving that copy back from the inline tool (e.g., via tool port 224 or 228). As a result, no forwarding of the packets to the destination port (e.g., network ports 214, 218, 234 or 236) takes place after the packets come back to the network device 210. For example, a multicast packet arriving at the network port 212 will be transmitted to the network port 214 and the tool port 226. The copy transmitted to the tool port 226 will be dropped at the tool port 228 when it arrives there.

Although FIG. 2 illustrates an embodiment of a network device 210 connected to an inline tool 220 for monitoring network traffic flow, a person having ordinary skill in the art readily appreciates that the technology can be applied to network devices connected to one or more inline tools for performing various functionalities. For example, a network device can be connected to a group of inline tools managed in a load sharing manner. Each of the inline tools performs a particular task on the network traffic packets. Alternatively, a network device can be connected to multiple inline tools arranged in a cascaded manner. Multiple inline tools can run within an umbrella inline tool. The umbrella inline tool manages its inline tools for performing various types of network traffic analysis and processing tasks.

Figure 3:
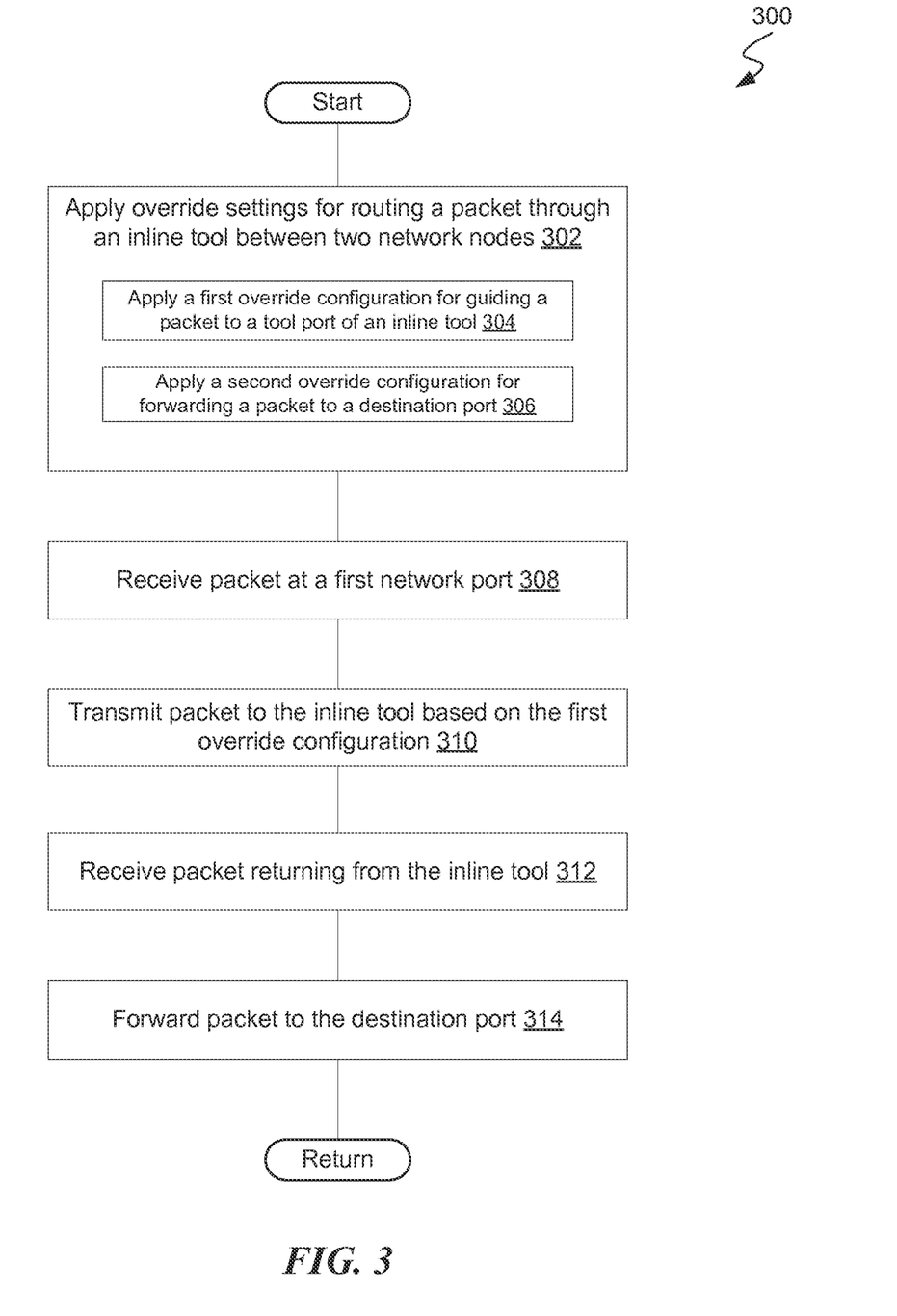
FIG. 3 illustrates a method performed by a network device for routing packets through an inline tool between two network nodes.

FIG. 3 illustrates a method 300 performed by a network device for routing packets through an inline tool between two network nodes. The network device can be the network device 110 of FIG. 1 or the network device 210 of FIG. 2. In some embodiments, a processing unit of the network device (e.g., processor 602) can perform the method 300.

The method 300 starts at block 302 in which at least two override settings are applied to the packet transmission configuration for defining how packets arriving at the network ports of the network are treated. In particular, a first override setting is applied (as indicated by block 304), and a second override setting is applied (as indicated by block 306). The first override setting is configured to disable the packet forwarding mechanism for any packet received at a particular network port. In particular, the first override setting causes the network device to execute the MAC address learning mechanism while overriding the packet forwarding mechanism with a custom packet forwarding mechanism that routes the packet, received at the first network port, to a first tool port of the inline tool. The second override setting is configured to disable the MAC address learning mechanism for the packet received back at the network device, having come back from the inline tool via the second tool port (e.g., tool port 228 of FIG. 2). In particular, the second override setting causes the network device to execute the packet forwarding mechanism and to disable the MAC address learning mechanism, preventing the MAC-address-to-port association from being learned for the packet received at the second tool port. Step 302 may be performed during manufacture of the network device, or it may be performed after manufacture and during configuration, prior to normal operation.

At block 308, a packet is received at a first network port of the network device. In some embodiments, at block 308, the network device executes a MAC address learning mechanism. In such embodiments, the network device performs a look-up of the address table of the network device to identify whether the address table has stored the source MAC address of the packet. If the MAC address is not stored, the network device generates a new entry in the address table and memorizes, or stores, the (new) association between the MAC address and the arrival port (e.g., the network port 212 of FIG. 2) for that new entry. If the MAC address is stored (i.e., an existing entry recording the association between the MAC address and the port), the network device proceeds to block 310.

At block 310, the network device, based on the first override setting, routes the packet to a tool port of an inline tool. For example, upon receiving a packet at the first network port (e.g., port 212 of FIG. 2), the network device, due to the first override setting, does not automatically forward the packet to the packet's destination address (as would otherwise be done in accordance with the standard MAC address forwarding capability of the network device). Instead, the network device transmits the packet to a first tool port of the network device for transmission to the inline tool.

At block 312, the network device receives the packet on its return journey to the network device from the inline tool (via a second tool port). At block 314, the network device forwards, or routes, the packet to the destination (network) port defined by the packet's destination MAC address. In particular, the network device forwards the packet using the originally learned association between the destination MAC address and the network port. Further, the network device, due to the second override setting, assigns the second network port and the second tool port to the same class, and configures a class priority associated with the second network port to be higher than a class priority associated with the second tool port. As a result, the packet can be routed to the network port based on the disabled automatic MAC learning mechanism.

Figure 4:
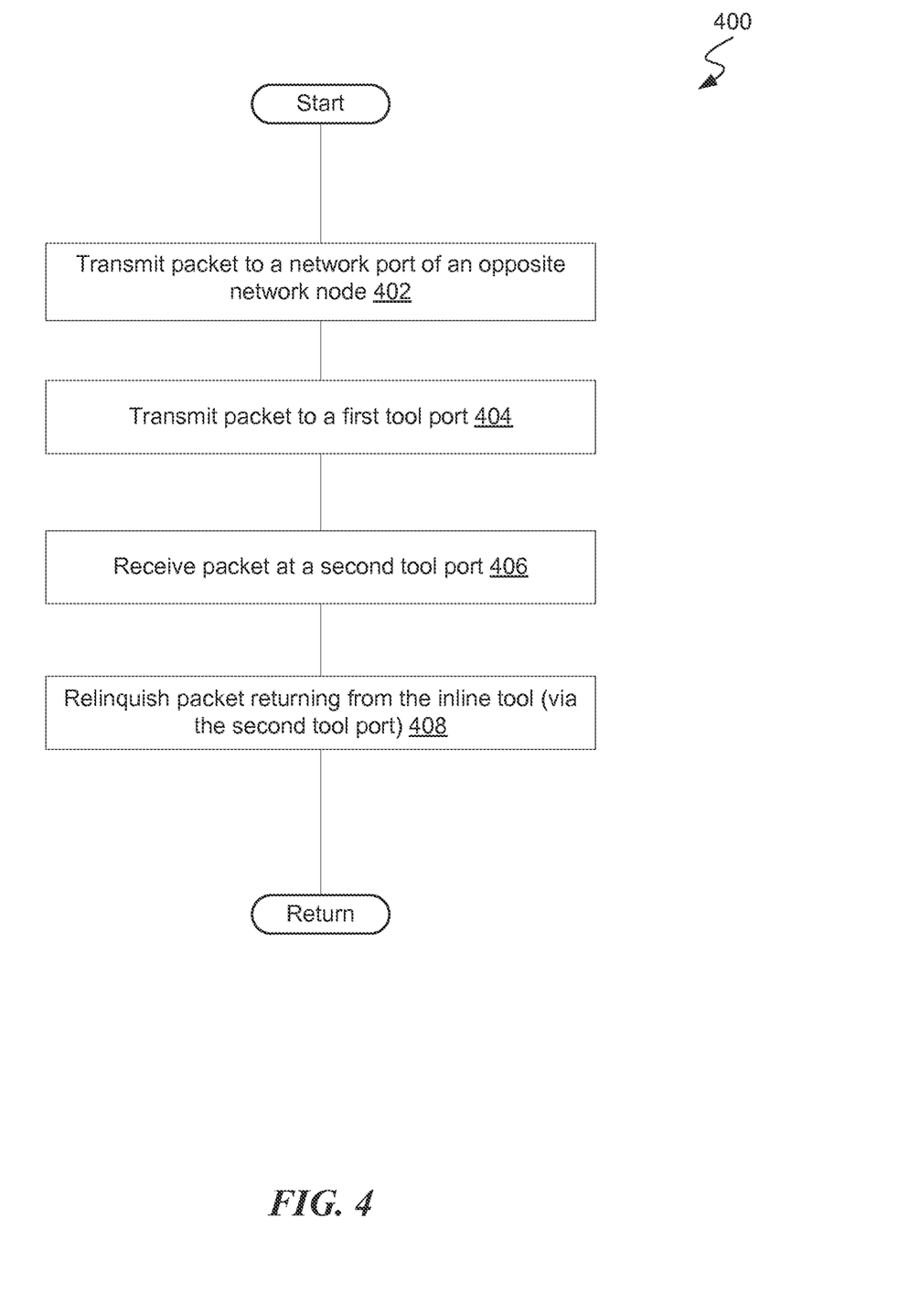
FIG. 4 illustrates a method performed by a network device for routing packets through an inline tool for a multicast and/or a broadcast of packets.

FIG. 4 illustrates a method 400 performed by a network device for routing packets through an inline tool for a multicast and/or a broadcast of packets. In some embodiments, the method 400 can be performed upon detecting a packet is of either a multicast type or a broadcast type.

At block 402, the packet is transmitted to a network port that is connected to an opposite network node from which the packet is originally received by the network device. For example, if the packet is received at network port 212 of the network node 202, the packet is transmitted to the network port 214 of network node 204. At block 404, the packet (e.g., copy of the packet) is further transmitted to a tool port that is connected to an inline tool for analysis of that packet. For example, the packet is transmitted, based on the first override setting, to the tool port 226.

At block 406, the network device receives the packet returning to the device from the inline tool via a second tool port (e.g., tool port 228). At block 408, based on a configuration setting applied to the packet transmission configuration of the network device, the packet is relinquished after being received at the second tool port.

Figure 5:
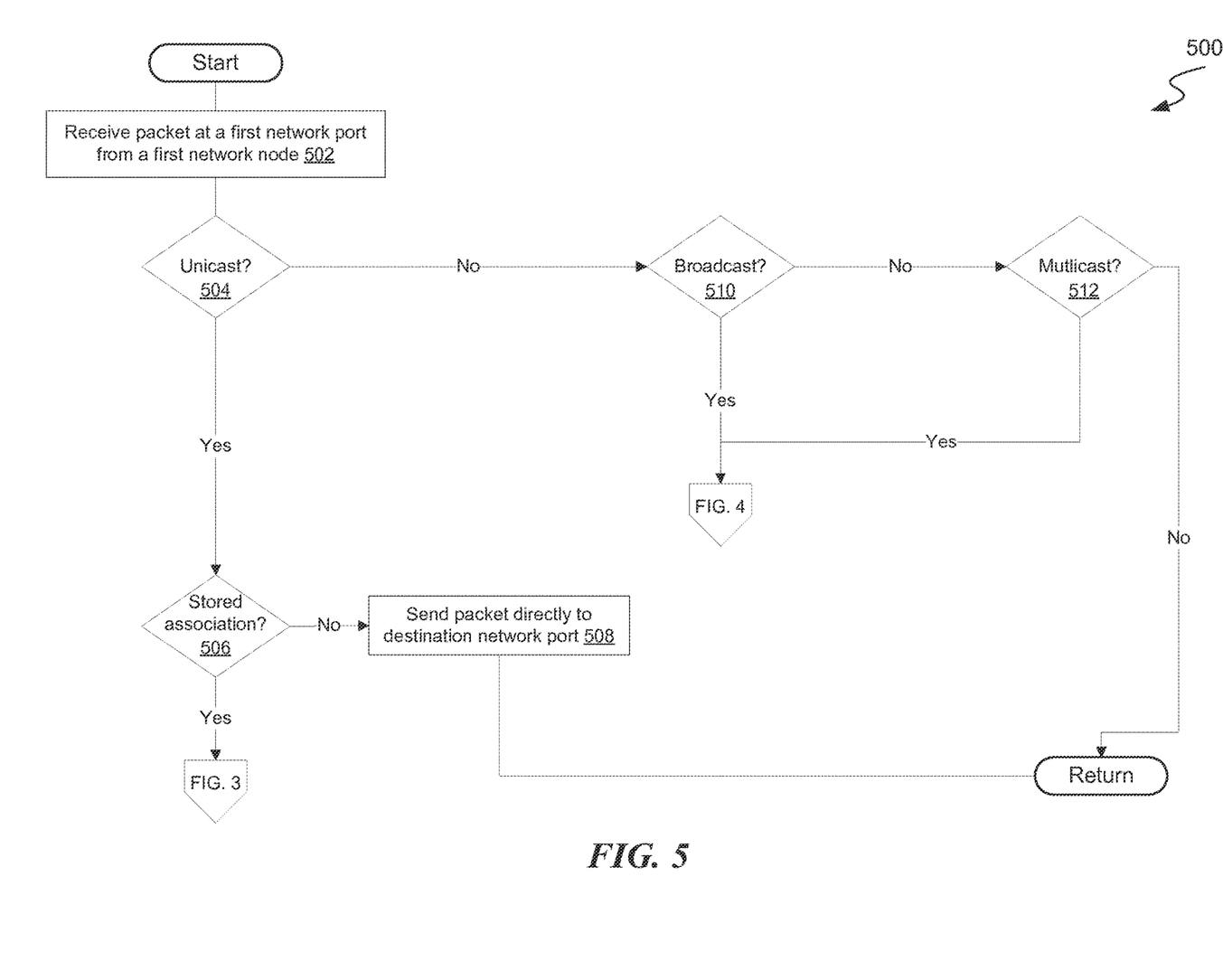
FIG. 5 illustrates a method performed by a network device for handling various exceptions when routing different packet types through an inline tool between two network nodes.

FIG. 5 illustrates a method 500 performed by a network device for handling various exceptions when routing different packet types through an inline tool between two network nodes. In some embodiments, a processing unit (e.g., processor 604) of the network device can perform the method 500. The network device can be the network device 110 of FIG. 1 or the network device 210 of FIG. 2. In accordance with some embodiments, there can be at least three exceptions, or scenarios, in which the network device routes the different packet types through the inline tool: unicast packets scenario; broadcast packets scenario; and multicast packets scenario.

At block 502, the network device receives a packet at an (arrival) network port from a network node connected to a network (e.g., first network port 212 of FIG. 2). At block 504, the network device determines whether the packet is a unicast type packet. If the packet is a unicast packet (i.e., "Yes"), the method 500 proceeds to block 506. If the packet is not a unicast packet (i.e., "No"), the method 500 proceeds to block 510. In some embodiments, if the packet is not a unicast packet (i.e., "No"), the method 500 proceeds to block 512 directly.

At block 506, a determination is made whether the source MAC address of the packet is stored in an address table of the network device. That is, the network device identifies if there exists an association entry for the MAC address and a port of the network device. If there is no association stored in the address table, the network device proceeds to block 508. At block 508, the packet is transmitted directly to a (destination) network port defined, e.g., in a header of the packet. If there is an association stored in the address table, the method 500 proceeds to the method 300 described with reference to FIG. 3.

At block 510, a determination is made whether the packet is a broadcast packet. If the packet is a broadcast packet (i.e., "Yes"), the method 500 proceeds to execute the method 400 as discussed in reference to FIG. 4. That is, if the packet is a broadcast packet, the method 400 is executed. If the packet is not a broadcast packet (i.e., "No"), the method 500 proceeds to block 512. In some embodiments, if the packet is not a broadcast packet (i.e., "No"), the method 500 returns.

At block 512, a determination is made whether the packet is a multicast packet. If the packet is a multicast packet (i.e., "Yes"), the method 500 proceeds to execute the method 400 as discussed in reference to FIG. 4. That is, if the packet is a multicast packet, the method 400 is executed. If the packet is not a multicast packet (i.e., "No"), the method 500 returns. In some embodiments, if the packet is not a multicast packet (i.e., "No"), the method 500 proceeds to block 510.

Figure 6:
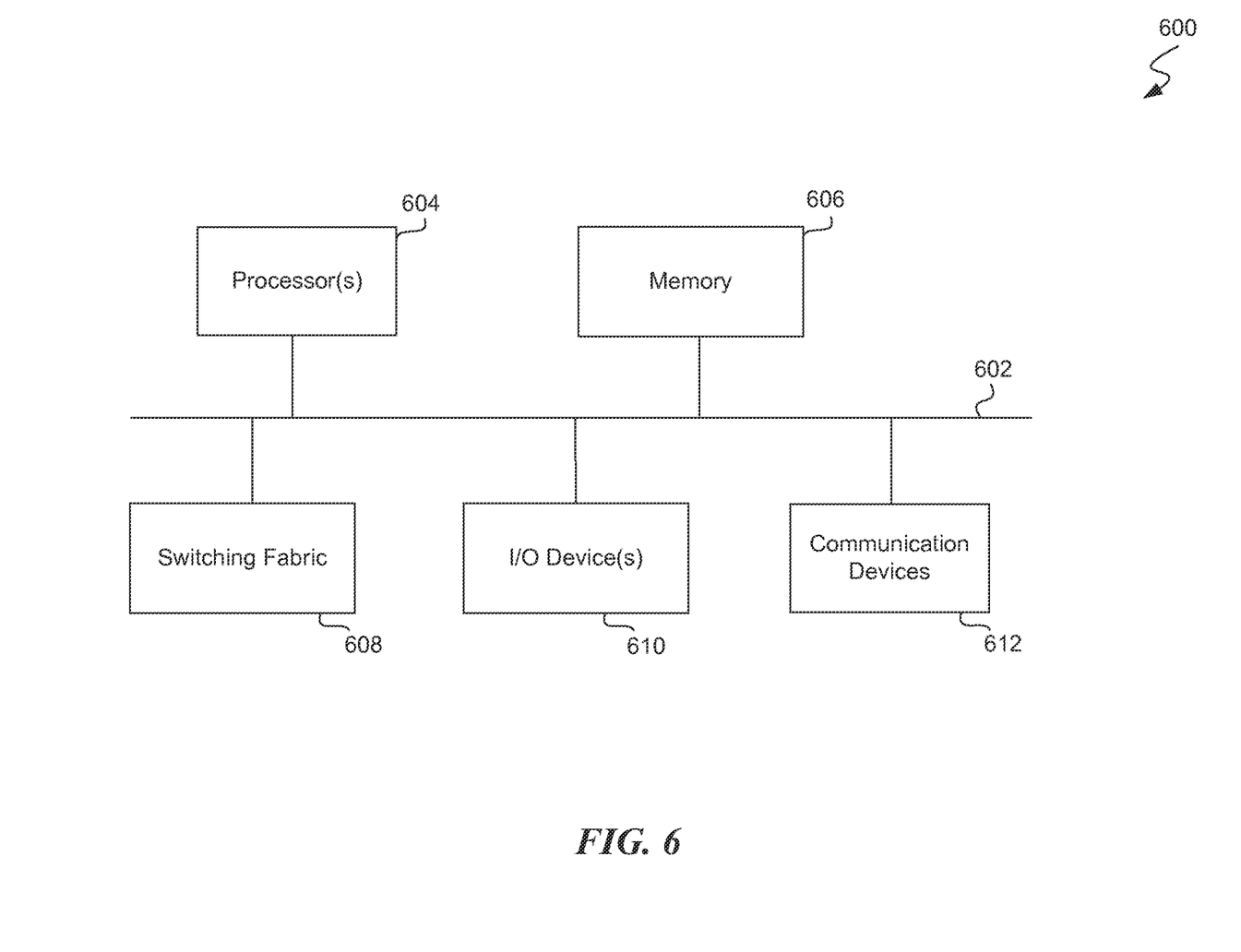
FIG. 6 illustrates an example of a network device in which the techniques introduced herein can be implemented.

FIG. 6 illustrates a high level example of the architecture of a network device 600 in which the techniques introduced above can be implemented. In some embodiments, the network device 600 represents the overall hardware architecture of the network device 110 or the network device 210 described above. The network device 600 includes a processor 604, a memory 606, a switching fabric 608, one or more network communication devices 612, and optionally one or more input/output devices 610, all of which are coupled to each other through an interconnect 602.

The processor 604 can be one or more general-purpose programmable microprocessors, microcontrollers, application specific integrated circuits (ASICs), programmable gate arrays, or the like, or a combination of such devices. The processor 604 controls the overall operation of the network device 600. The processor 604 can be used to perform various functions described herein. For example, in some embodiments, the processor 604 receive input from a user for configuring the network device (e.g., applying override settings to the packet transmission configuration of the network device and/or otherwise configuring the operations of the network device).

The memory 606 can be or include one or more physical storage devices, which may be in the form of random access memory (RAM), read-only memory (ROM) (which may be erasable and programmable), magnetic hard disk, flash memory, miniature hard disk drive, or other suitable type of storage device, or a combination of such devices. The switching fabric 608 can be a commodity packet switching fabric. The memory 606 can store data and instructions that configure the processor 604 to execute operations in accordance with the techniques described above.

The communication devices 612 can each be or include, for example, an Ethernet adapter, cable modem, Wi-Fi adapter, cellular transceiver, Bluetooth transceiver, or the like, or a combination thereof. Depending on the specific intended usage of the network device 600, the I/O devices 610 can include devices such as a display (which may be a touch screen display), audio speaker, keyboard, mouse or other pointing device, etc.

In this description, the term "computer-readable medium" refers to any medium that participates in providing instructions to the processor 604 for execution. Such a medium may take many forms, including but not limited to, non-volatile media, volatile media, and transmission media. Non-volatile media includes, for example, optical or magnetic disks, such as the storage device(s) 608. A non-volatile medium may be considered to be an example of a non-transitory medium. Volatile media includes dynamic memory, such as the memory 606. A volatile medium may be considered to be another example of a non-transitory medium. Transmission media includes coaxial cables, copper wire and fiber optics, including the wires that comprise the interconnect 602.

Unless contrary to physical possibility, it is envisioned that (i) the methods/steps described herein (e.g., method 300, 400, 500, etc.) may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

What is claimed:
1. A method comprising:
receiving a first packet at a first network port of a network device from a first network node;
determining, without modifying the first packet and without adding information to the first packet, that the first packet is to be routed first along a first routing path from the first network port to a first tool port configured to forward the first packet to an inline tool configured to process the first packet, and subsequently forwarded from a second tool port configured to receive the first packet from the inline tool to a second network port of the network device for forwarding on a network;
routing the first packet, without modifying the first packet and without adding information to the first packet, first from the first network port to the first tool port of the network device for transmission to an inline tool and subsequently from the second tool port of the network device to the second network port of the network device for transmission to a second network node according to the first routing path, wherein said routing the first packet is performed subsequent to determining that the first packet is to be routed first along the first routing path;

receiving a second packet at a third network port of the network device from a third network node;

determining, without modifying the second packet and without adding information to the second packet, that the second packet is to be routed first along a second routing path from the third network port to the first tool port configured to forward the second packet to the inline tool configured to process the second packet, and subsequently forwarded from the second tool port configured to receive the second packet from the inline tool to a fourth network port of the network device for forwarding on the network; and routing the second packet, without modifying the second packet and without adding information to the second packet, first from the third network port to the first tool port of the network device for transmission to the inline tool and subsequently from the second tool port of the network device to the fourth network port of the network device for transmission to a fourth network node according to the second routing path, wherein said routing the second packet is performed subsequent to determining that the second packet is to be routed first along the second routing path.

2. The method of claim 1, wherein the first packet is routed to the second network port based on the first packet being received at the first network port, and the second packet is routed to the fourth network port based on the second packet being received at the third network port.

3. The method of claim 2, wherein routing the first packet from the first network port to the first tool port includes executing a MAC address learning mechanism associating a MAC address corresponding to the first packet with the first network port, and wherein routing the first packet to the second network node includes executing a packet forwarding mechanism forwarding packets based on MAC addresses associated with the first network port.

4. The method of claim 3,
wherein routing the first packet to the first tool port comprises applying a first override setting to a packet transmission configuration associated with the first network port of the network device, the first override setting causing the network device to transmit the first packet, received at the first network port, to the first tool port; and
wherein routing the first packet to the second network port comprises applying a second override setting to a packet transmission configuration associated with the second tool port of the network device, the second override setting causing the network device to transmit the first packet, received at the second tool port, to the second network port.

5. The method of claim 4,
wherein the first override setting is configured to execute the MAC address learning mechanism while overriding the packet forwarding mechanism with a custom packet forwarding mechanism for the first packet received at the first network port; and
wherein the second override setting is configured to execute the packet forwarding mechanism and to disable the MAC address learning mechanism for the first packet received at the second tool port.

6. The method of claim 4, wherein applying a second override setting comprises:

assigning the second network port and the second tool port to a same class; and
configuring a class priority associated with the second network port to be higher than a class priority associated with the second tool port;
wherein said configuring of the class priority disables an automatic MAC learning mechanism associated with the second tool port, and wherein the first packet is routed to the second network port based on the disabled automatic MAC learning mechanism associated with the second tool port.

7. The method of claim 1, wherein routing the first packet, received at the second tool port, to the second network port comprises:
accessing a data structure including recorded associations between MAC addresses and ports of the network device;
identifying the second network port for transmission of the first packet to the second network node, based on an association between the second network port and a destination MAC address of the first packet, the association recorded in the data structure based on the MAC address learning mechanism associated with the second network port.

8. A network device, comprising:
a processor; and
memory storing instructions that, when executed by the processor, cause the network device to:
receive a first packet at a first network port of a network device from a first network node;
determine, without modifying the first packet and without adding information to the first packet, that the first packet is to be routed along a first routing path first from the first network port to a first tool port configured to forward the first packet to an inline tool configured to process the first packet, and subsequently forwarded from a second tool port configured to receive the first packet from the inline tool to a second network port of the network device for forwarding on a network;
route the first packet, without modifying the first packet and without adding information to the first packet, first from the first network port to the first tool port of the network device for transmission to an inline tool and subsequently from the second tool port of the network device to the second network port of the network device for transmission to a second network node according to the first routing path, wherein said route the first packet is performed subsequent to said determine that the first packet is to be routed first along the first routing path;
receive a second packet at a third network port of the network device from a third network node;
determine, without modifying the second packet and without adding information to the second packet, that the second packet is to be routed along a second routing path first from the third network port to the first tool port configured to forward the second packet to the inline tool configured to process the second packet, and subsequently forwarded from the second tool port configured to receive the second packet from the inline tool to a fourth network port of the network device for forwarding on the network; and
route the second packet, without modifying the second packet and without adding information to the second packet, first from the third network port to the first tool port of the network device for transmission to the inline tool and subsequently from the second tool port of the network device to the fourth network port of the network device for transmission to the fourth network node according to the second routing path, wherein said route the second packet is performed subsequent to said determine that the second packet is to be routed first along the second routing path.

9. The network device of claim 8, wherein the first packet is routed to the second network port based on the first packet being received at the first network port, and the second packet is routed to the fourth network port based on the second packet being received at the third network port.

10. The network device of claim 9, wherein routing the first packet from the first network port to the first tool port includes executing a MAC address learning mechanism associating a MAC address corresponding to the first packet with the first network port, and wherein routing the first packet to the second network node includes executing a packet forwarding mechanism forwarding packets based on MAC addresses associated with the first network port.

11. The network device of claim 10,
wherein routing the first packet to the first tool port comprises applying a first override setting to a packet transmission configuration associated with the first network port of the network device, the first override setting causing the network device to transmit the first packet, received at the first network port, to the first tool port; and
wherein routing the first packet to the second network port comprises applying a second override setting to a packet transmission configuration associated with the second tool port of the network device, the second override setting causing the network device to transmit the first packet, received at the second tool port, to the second network port.

12. The network device of claim 11,
wherein the first override setting is configured to execute the MAC address learning mechanism while overriding the packet forwarding mechanism with a custom packet forwarding mechanism for the first packet received at the first network port; and
wherein the second override setting is configured to execute the packet forwarding mechanism and to disable the MAC address learning mechanism for the first packet received at the second tool port.

13. The network device of claim 11, wherein applying a second override setting comprises:
assigning the second network port and the second tool port to a same class; and
configuring a class priority associated with the second network port to be higher than a class priority associated with the second tool port;
wherein said configuring of the class priority disables an automatic MAC learning mechanism associated with the second tool port, and wherein the first packet is routed to the second network port based on the disabled automatic MAC learning mechanism associated with the second tool port.

14. The network device of claim 8, wherein routing the first packet, received at the second tool port, to the second network port comprises:
accessing a data structure including recorded associations between MAC addresses and ports of the network device;
identifying the second network port for transmission of the first packet to the second network node, based on an association between the second network port and a destination MAC address of the first packet, the association recorded in the data structure based on the MAC address learning mechanism associated with the second network port.

15. A computer program product comprising a non-transitory computer-readable medium having computer program instructions stored therein, execution of which by one or more computing devices causes the one or more computing devices to:
receive a first packet at a first network port of a network device from a first network node;
determine, without modifying the first packet and without adding information to the first packet, that the first packet is to be routed along a first routing path first from the first network port to a first tool port configured to forward the first packet to an inline tool configured to process the first packet, and subsequently forwarded from a second tool port configured to receive the first packet from the inline tool to a second network port of the network device for forwarding on a network;
route the first packet, without modifying the first packet and without adding information to the first packet, first from the first network port to the first tool port of the network device for transmission to an inline tool and subsequently from the second tool port of the network device to the second network port of the network device for transmission to a second network node according to the first routing path, wherein said route the first packet is performed subsequent to said determine that the first packet is to be routed first along the first routing path;
receive a second packet at a third network port of the network device from a third network node;
determine, without modifying the second packet and without adding information to the second packet, that the second packet is to be routed along a second routing path first from the third network port to the first tool port configured to forward the second packet to the inline tool configured to process the second packet, and subsequently forwarded from the second tool port configured to receive the second packet from the inline tool to a fourth network port of the network device for forwarding on the network; and
route the second packet, without modifying the second packet and without adding information to the second packet, first from the third network port to the first tool port of the network device for transmission to the inline tool and subsequently from the second tool port of the network device to the fourth network port of the network device for transmission to a fourth network node according to the second routing path, wherein said route the second packet is performed subsequent to said determine that the second packet is to be routed first along the second routing path.

16. The computer program product of claim 15, wherein the first packet is routed to the second network port based on the first packet being received at the first network port, and the second packet is routed to the fourth network port based on the second packet being received at the third network port.

17. The computer program product of claim 16, wherein routing the first packet from the first network port to the first tool port includes executing a MAC address learning mechanism associating a MAC address corresponding to the first packet with the first network port, and wherein routing the first packet to the second network node includes executing a packet forwarding mechanism forwarding packets based on MAC addresses associated with the first network port.

18. The computer program product of claim 17,
wherein routing the first packet to the first tool port comprises applying a first override setting to a packet transmission configuration associated with the first network port of the network device, the first override setting causing the network device to transmit the first packet, received at the first network port, to the first tool port; and
wherein routing the first packet to the second network port comprises applying a second override setting to a packet transmission configuration associated with the second tool port of the network device, the second override setting causing the network device to transmit the first packet, received at the second tool port, to the second network port.

19. The computer program product of claim 18,
wherein the first override setting is configured to execute the MAC address learning mechanism while overriding the packet forwarding mechanism with a custom packet forwarding mechanism for the first packet received at the first network port; and
wherein the second override setting is configured to execute the packet forwarding mechanism and to disable the MAC address learning mechanism for the first packet received at the second tool port.

20. The computer program product of claim 18, wherein applying the second override setting comprises:
assigning the second network port and the second tool port to a same class; and
configuring a class priority associated with the second network port to be higher than a class priority associated with the second tool port;
wherein said configuring of the class priority disables an automatic MAC learning mechanism associated with the second tool port, and wherein the first packet is routed to the second network port based on the disabled automatic MAC learning mechanism associated with the second tool port.

21. A method comprising:
receiving a first packet at a first ingress network port of a plurality of ingress network ports of a network device from a first network node;
determining, without modifying the first packet and without adding information to the first packet, that the first packet is to be routed first along a first routing path from the first ingress network port to a first egress tool port of a plurality of egress tool ports of the network device, then through the first egress tool port and through an inline tool that is external to the network device, and then through a first ingress tool port of a plurality of ingress tool ports of the network device to a first egress network port of a plurality of egress network ports of the network device for forwarding on a network;
routing the first packet, without modifying the first packet and adding information to the first packet, from the first ingress network port to the first egress tool port of the network device for transmission to the inline tool according to the first routing path, wherein said routing the first packet is performed subsequent to determining that the first packet is to be routed first along the first routing path;
receiving the first packet at the first ingress tool port from the inline tool; and
routing the first packet, without modifying the first packet and adding information to the first packet, from the first ingress tool port to the first egress network port for transmission to a second network node according to the first routing path.

* * * * *